United States Patent
Sawada et al.

(10) Patent No.: US 7,158,541 B2
(45) Date of Patent: Jan. 2, 2007

(54) SIGNAL SYNCHRONIZATION METHOD AND RECEIVER DEVICE FOR PACKET COMMUNICATION

(75) Inventors: Manabu Sawada, Yokohama (JP); Masahiro Kuwabara, Yokosuka (JP)

(73) Assignee: DENSO Corporation, Kariya (JP)

( * ) Notice: Subject to any disclaimer, the term of this patent is extended or adjusted under 35 U.S.C. 154(b) by 707 days.

(21) Appl. No.: 09/792,517

(22) Filed: Feb. 23, 2001

(65) Prior Publication Data

US 2001/0015988 A1 Aug. 23, 2001

(30) Foreign Application Priority Data

Feb. 23, 2000 (JP) ............... 2000-052167

(51) Int. Cl.
*H04J 3/06* (2006.01)
*H04L 7/00* (2006.01)

(52) U.S. Cl. ............ 370/513; 370/324; 375/143; 375/366

(58) Field of Classification Search ......... 370/479, 370/501, 503, 509, 511, 513, 324; 375/142, 375/143, 149, 150, 366, 260
See application file for complete search history.

(56) References Cited

U.S. PATENT DOCUMENTS

| | | | | |
|---|---|---|---|---|
| 4,813,006 A | * | 3/1989 | Burns et al. | 708/5 |
| 5,392,314 A | * | 2/1995 | Wolf | 375/224 |
| 5,768,305 A | * | 6/1998 | Kanda | 375/150 |
| 6,075,807 A | * | 6/2000 | Warren et al. | 375/143 |
| 6,154,486 A | * | 11/2000 | Scott et al. | 375/142 |
| 6,330,292 B1 | * | 12/2001 | Dent et al. | 375/343 |
| 6,658,063 B1 | * | 12/2003 | Mizoguchi et al. | 375/260 |
| 6,731,594 B1 | * | 5/2004 | Bohnke | 370/208 |
| 6,765,973 B1 | * | 7/2004 | Miller et al. | 375/354 |

FOREIGN PATENT DOCUMENTS

| | | | |
|---|---|---|---|
| EP | 852430 A2 | * | 7/1998 |
| EP | 1005204 A2 | * | 5/2000 |

OTHER PUBLICATIONS

Astely, D. et al., "Burst Synchronization on Unknown Frequency Selective Channels with Co-channel Interference Using an Antenna Array," IEEE 49th Vehicular Technology Conference, May 16-20, 1999, vol. 3, pp. 2363-2367.*

Notice of Rejection dated Mar. 09, 2004 in corresponding Japanese Application No. 2000-052167.

Mizoguchi, Masato et al., "A Performance of a symbol timing detection circuit for OFDM wireless LAN systems," Communication Society Conference of Electronics and Information Communications Institute, B-5-61, pp. 296, 1999.

* cited by examiner

*Primary Examiner*—Seema S. Rao
*Assistant Examiner*—Donald L Mills
(74) *Attorney, Agent, or Firm*—Harness, Dickey & Pierce, PLC

(57) ABSTRACT

A receiver device for a packet communication system receives a packet signal appended at its head with a known number (N) of repetition signals. A correlation value of a received signal is outputted from a normalizing correlator and compared with a threshold value in a comparator. The output of the comparator is inputted to a synchronization signal generating circuit, which includes M ($\leq$N−1) delay elements connected in series and an AND circuit for taking the logical product of the outputs of the delay elements. When the output of the comparator is high-level and the outputs of the M delay elements 431 are also all high-level, a synchronization signal at symbol timing is outputted from the AND circuit.

4 Claims, 8 Drawing Sheets

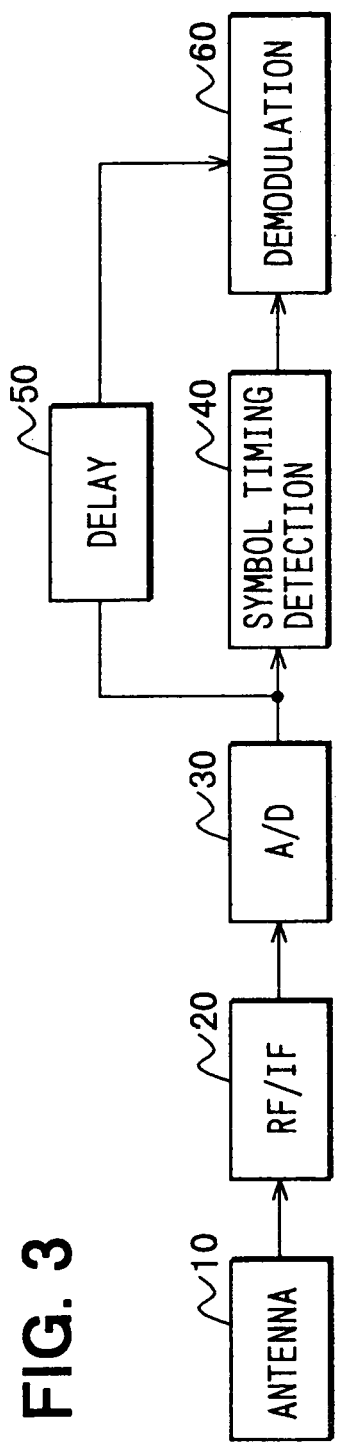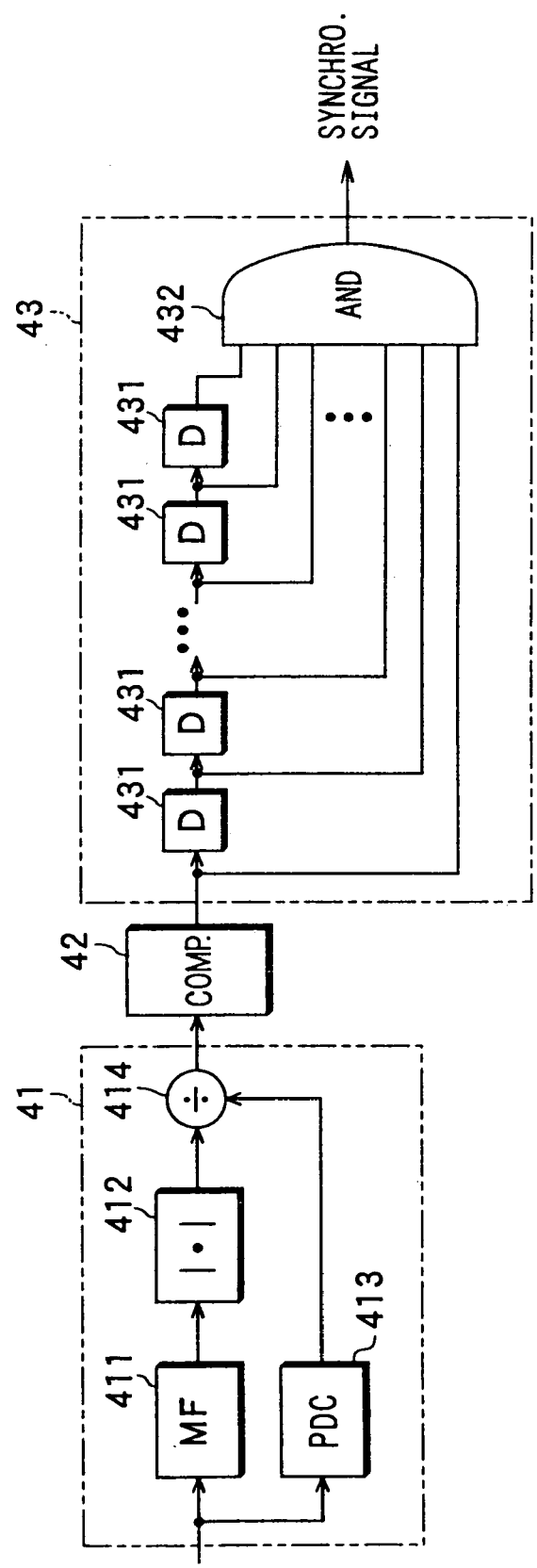

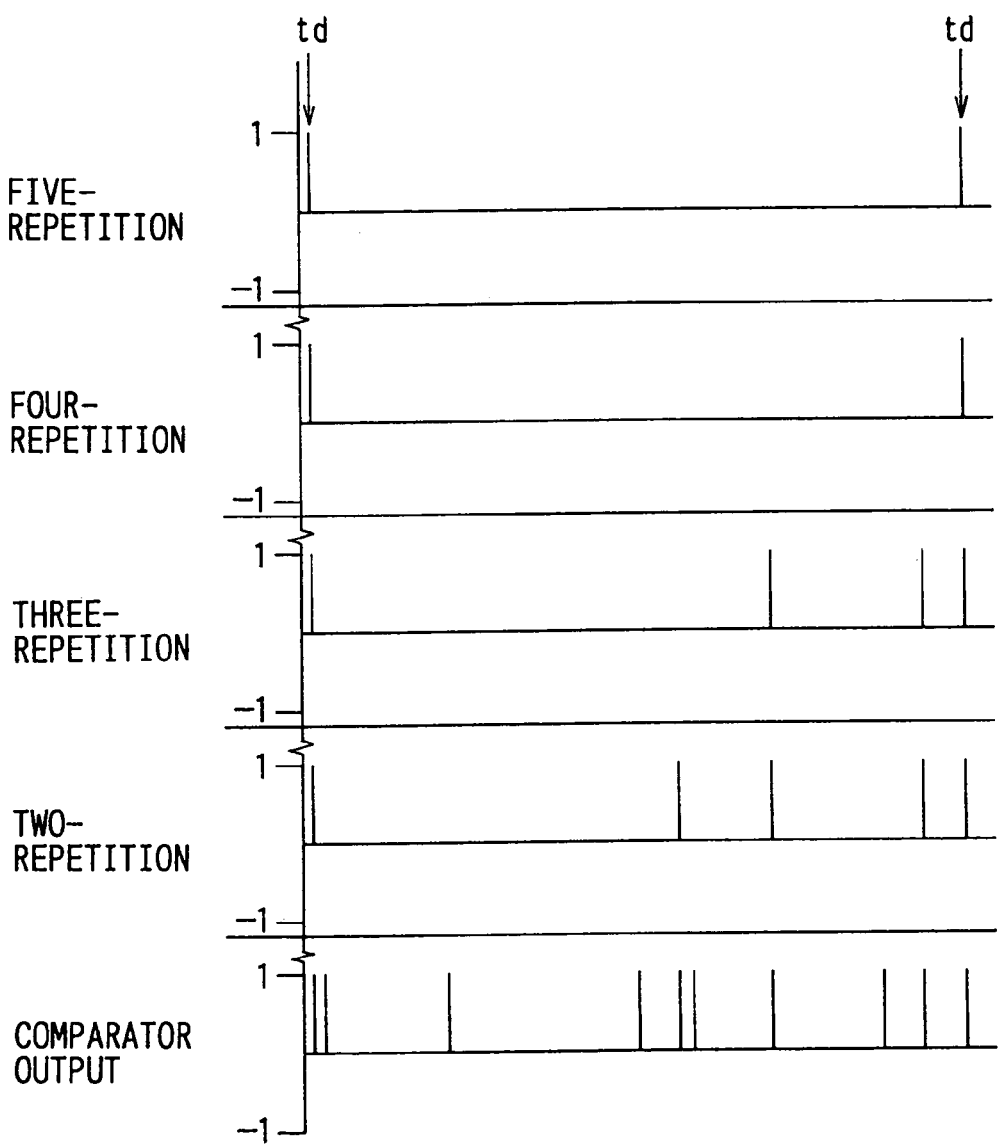

| ITEM | PARAMETER | UNIT |
|---|---|---|
| SUB-CARRIER MODULATION | QPSK | |
| NUMBER OF SUB-CARRIER | 52 | |
| SYSTEM DATA RATE | 24 | Mbps |
| SAMPLING FREQUENCY | 20 | MHz |
| SYNCHRONIZATION | INCOMPLETE | |
| DATA/PACKET | 96 | BYTE |
| SPEED OF MOVEMENT | 10.8 | Km/h |
| PROPAGATION PATH MODEL | OFF-LINE-OF-SIGHT | |
| NUMBER OF REPETITION (N) | 5 | TIME |
| FORWARD SHIFT | 5 | SAMPLE PERIOD |

US 7,158,541 B2

SIGNAL SYNCHRONIZATION METHOD AND RECEIVER DEVICE FOR PACKET COMMUNICATION

CROSS REFERENCE TO RELATED APPLICATION

This application is based on and incorporates herein by reference Japanese Patent Application No. 2000-52167 filed Feb. 23, 2000.

BACKGROUND OF THE INVENTION

This invention relates to a signal synchronization method and a receiver device that are applicable to a communication system. More particularly, the method and device conduct packet communication in bursts or asynchronously for receiving a packet signal appended at its head with a known number of repetition signals and generating a synchronization signal on the basis of a correlation value of this received signal.

In a communication system which conducts packet communication in bursts, because the arrival of packet signals is not predictable, it is necessary for individual demodulation synchronization processing to be carried out on the receiving side for each packet. To this end, it is proposed that a known number N of repetition signals are appended to the head of each packet as a preamble and on the receiving side a synchronization signal is generated when the repetition signals appended to the head of the packet are recognized. For example, "A performance of a Symbol Timing Detection Circuit for OFDM Wireless LAN Systems" published as B-5-61 in 1999 Communication Society Conference of Electronics and Information Communications Institute teaches that a synchronization signal is generated on the basis of peak integration processing being carried out with a digital filter on a correlator output (correlation peak signal) of the received signal.

However, because the correlator output is a multi-bit signal, multi-bit signal delay circuits and adders are needed in the digital filter for carrying out the peak integration processing. Consequently, the digital filter circuit becomes large-sized.

SUMMARY OF THE INVENTION

It is therefore an object of the present invention to provide a signal synchronization method and a receiver device which is capable of generating a synchronization signal easily.

According to this invention, a signal synchronization method and a receiver device conduct packet communication in bursts. A packet signal is appended at its head with a known number of repetition signals. A correlation value of a received signal of the packet signal is determined. The correlation value is compared with a threshold value, and a synchronization signal is generated when repetitiveness of the results of the comparison is recognized. Here, "conducts packet communication in bursts" means conducts packet communication in a non-continuous form, wherein synchronization is not made.

Preferably, the results of the comparison are successively delayed, and the repetitiveness is recognized on the basis of delayed outputs of the comparison results.

BRIEF DESCRIPTION OF THE DRAWINGS

The above and other objects, features and advantages of the present invention will become more apparent from the following detailed description made with reference to the accompanying drawings. In the drawings:

FIG. 3 is a block diagram showing a receiver device (RX) shown in FIG. 1;

FIG. 4 is a circuit diagram showing a symbol timing detection circuit shown in FIG. 3;

FIG. 10 is a timing diagram showing synchronization timing detection results attained when five-repetition detection, four-repetition detection, three-repetition detection and two-repetition detection are carried out by the symbol timing detection circuit shown in FIG. 8;

DETAILED DESCRIPTION OF THE PREFERRED EMBODIMENTS

Figure 1:
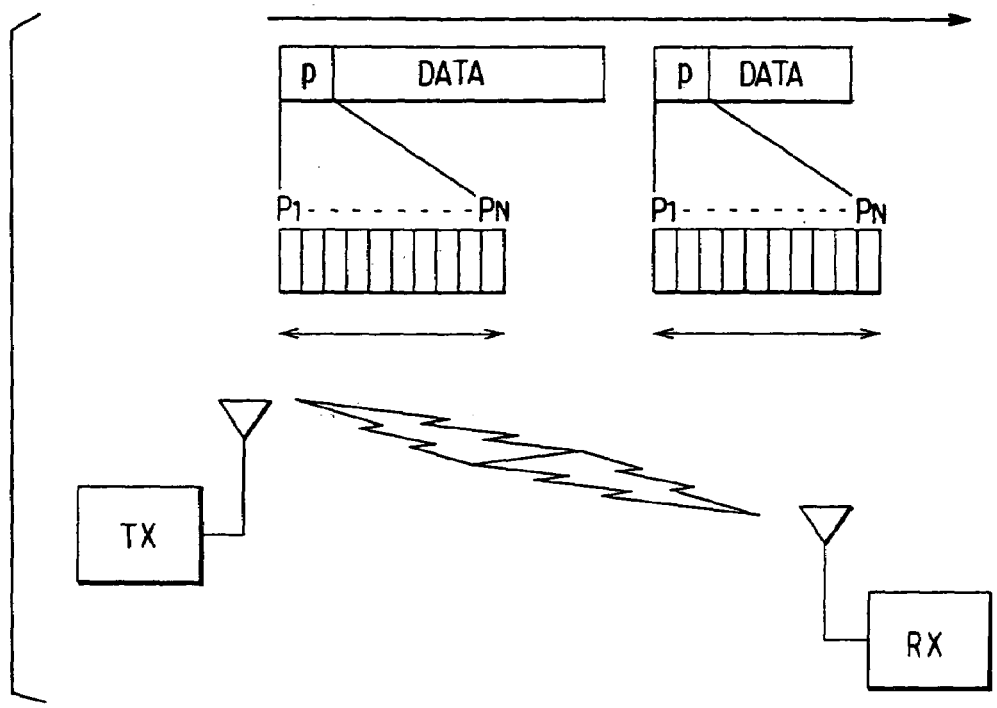
FIG. 1 is a schematic view showing a communication system according to a preferred embodiment of the invention, using OFDM (Orthogonal Frequency Division Multiplexing)

A preferred embodiment of the invention will now be described with reference to the drawings. This preferred embodiment is directed to a communication system using orthogonal frequency division multiplexing (OFDM), and the communication system is shown schematically in FIG. 1.

Packet signals each made up of data and a preamble (P) including of a known number N of repetition signals (P1 to PN) are transmitted in bursts or asynchronously from a transmitter device (TX). A receiver device (RX) receives these transmitted signals and generates a synchronization signal on the basis of the repetition signals of the preamble and demodulates the transmitted data.

Figure 2:
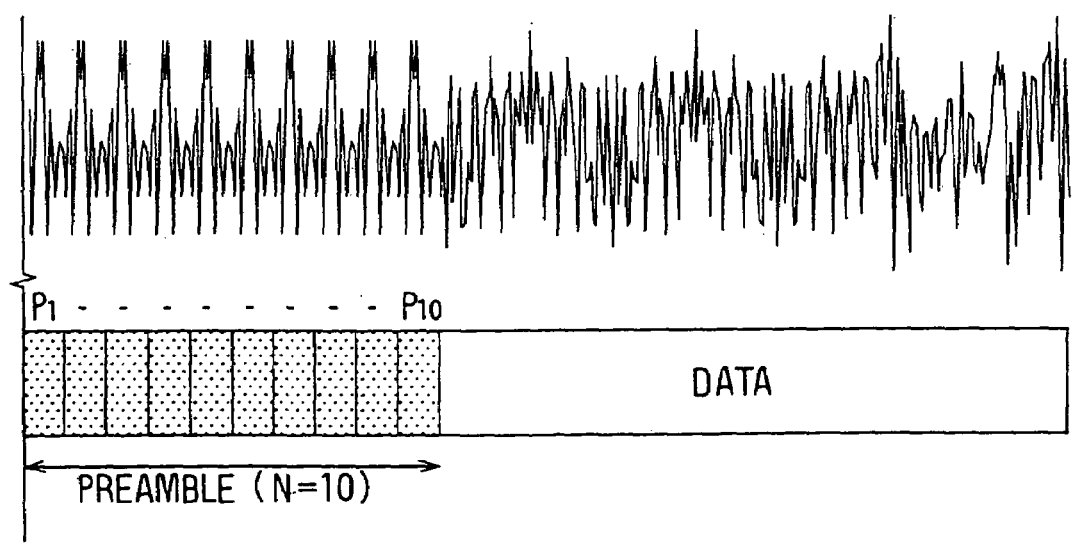
FIG. 2 is a timing diagram showing a signal transmission waveform in the embodiment shown in FIG. 1.

A transmitted signal is shown in FIG. 2. In the case of a communication system using OFDM, the waveform of a transmitted packet signal (the lower part of FIG. 2) made up of a preamble including a known number (N=10) of repetition signals and data constituting a transmitted information signal is as shown in the upper part of the FIG. 2.

The construction of the receiver device (RX) is shown in FIG. 3. The transmitted signal is received through an antenna 10 and undergoes predetermined signal processing in an RF/IF circuit 20 before being converted into a digital signal by an A/D converter 30. The output of this A/D converter 30 is inputted to a symbol timing detection circuit 40. In the symbol timing detection circuit 40, a correlation value of the output of the A/D converter 30 is obtained and compared with a threshold value, and a synchronization signal is generated when repetitiveness of the result of this comparison is recognized. The output of the A/D converter 30 is also inputted through a delay circuit 50 to a demodulation circuit 60. In this case, the delay circuit 50 delays the output of the A/D converter 30 so that the data is inputted to a demodulation circuit 60 at the same time as the synchronization signal outputted from the symbol timing detection circuit 40.

The construction of the symbol timing detection circuit 40 is shown in FIG. 4. This symbol timing detection circuit 40 is made up of a normalizing correlator 41 as correlation value detecting means, a comparator 42 constituting comparing means, and a synchronization signal generating circuit 43 as synchronization signal generating means.

The normalizing correlator 41 is made up of a matched filter (MF) 411, an absolute value circuit 412, a power detecting circuit 413 and a dividing circuit 414.

Figure 5:
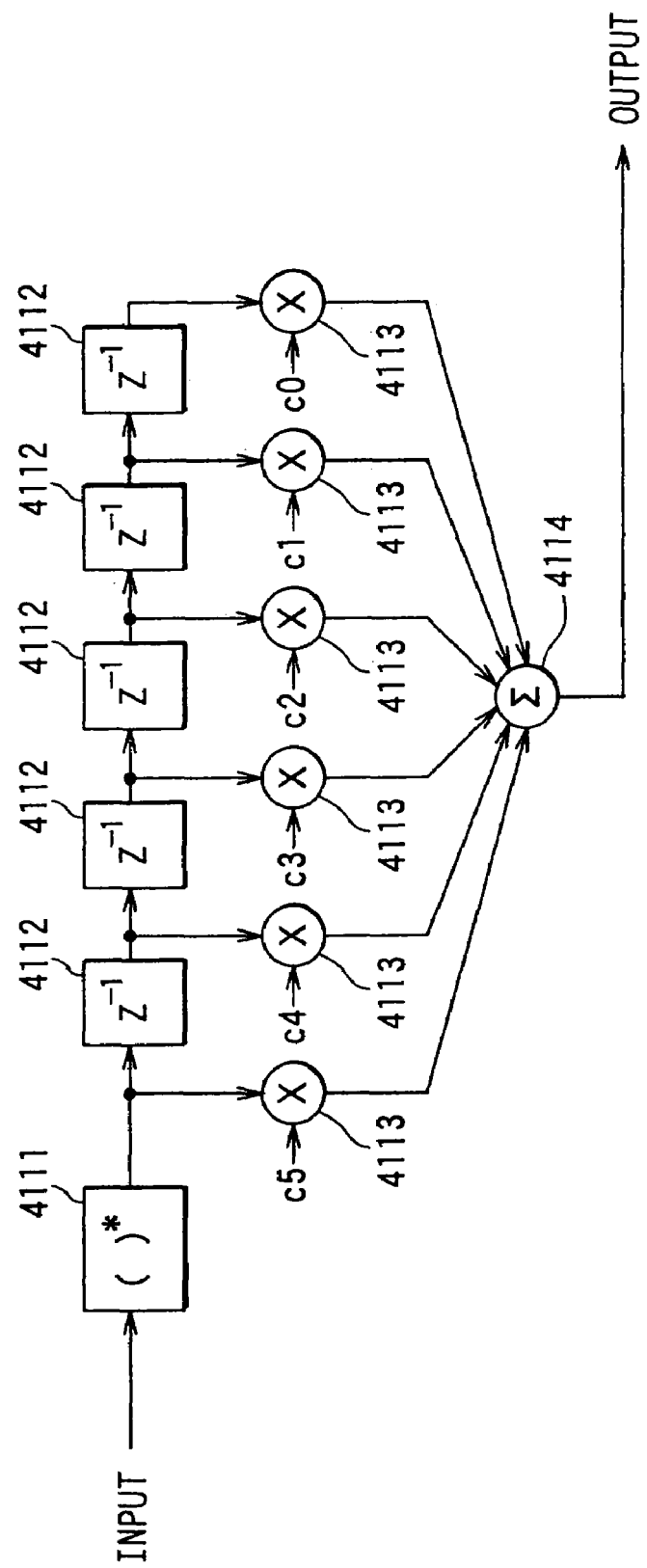
FIG. 5 is a circuit diagram showing a matched filter shown in FIG. 3.

As shown in FIG. 5, the matched filter 411 is made up of a complex conjugator 4111 for taking the complex conjugate of the input signal (signal expressed as a complex number), delay elements 4112 for delaying this signal, multipliers 4113 for multiplying the outputs of the delay elements 4112 by coefficients set for preamble detection (in the case of six sample periods, $c_5, c_4, c_3, c_2, c_1$ and $c_0$), and an adder 4114 for summing the outputs of the multipliers 4113, and outputs a correlation value of the input signal. This preferred embodiment is an example wherein there are six sample periods.

Figure 6:
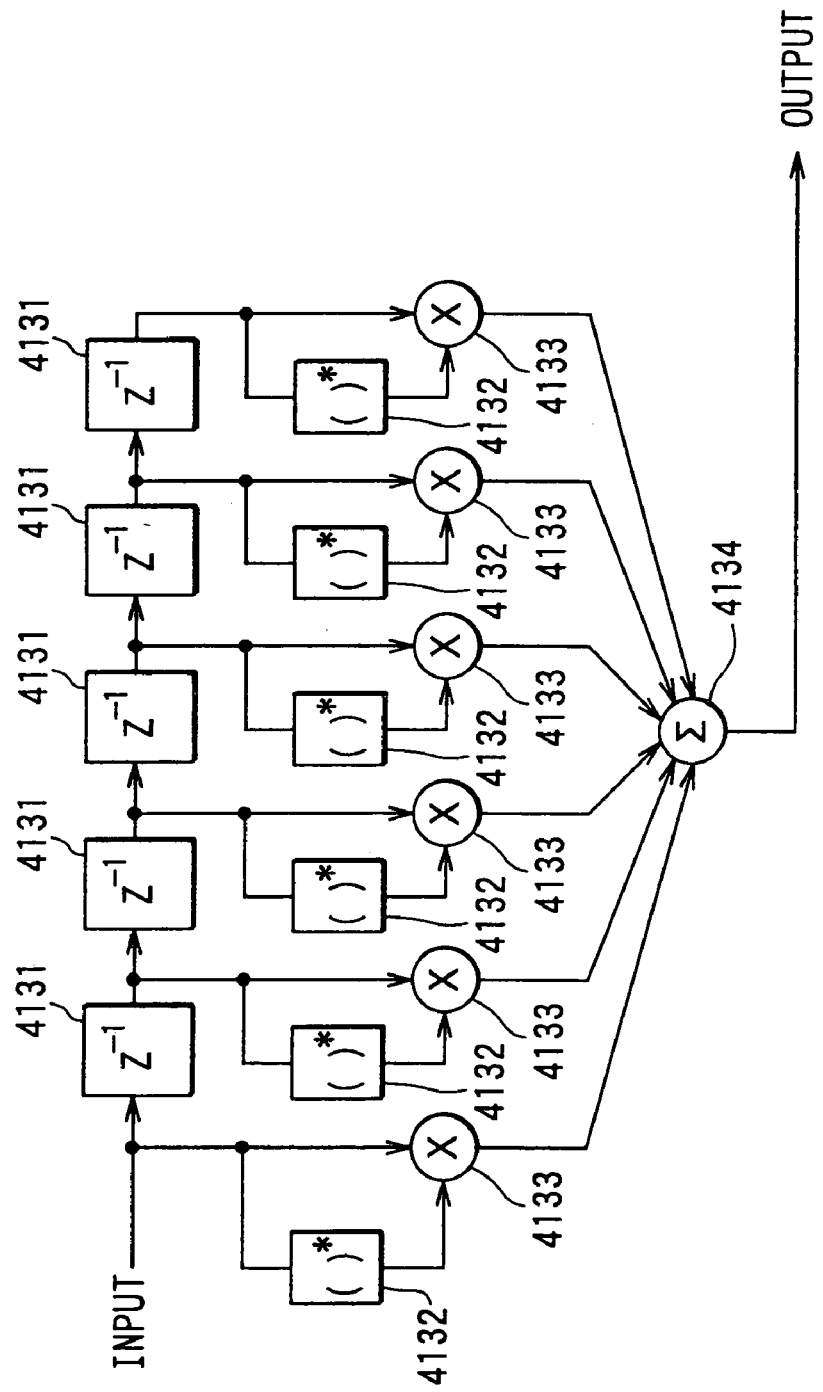
FIG. 6 is a circuit diagram showing a power detection circuit shown in FIG. 3.

As shown in FIG. 6, the power detecting circuit (in the case of six sample periods) 413 is made up of delay elements 4131 for delaying the input signal, complex conjugators 4132 for taking the complex conjugates of the outputs of the delay elements 4131, multipliers 4133 for multiplying the outputs of the delay elements 4131 by the outputs of the respective complex conjugators 4132, and an adder 4134 for summing the outputs of the multipliers 4133, and detects the power of the input signal.

Referring back to FIG. 4, the correlation value outputted from the matched filter 411 is converted into an absolute value by the absolute value circuit 412. The output from the absolute value circuit 412 is divided by the output of the power detecting circuit 413 in the dividing circuit 414. As a result, a normalized (standardized) correlation value is outputted from the normalizing correlator 41.

The correlation value outputted from the normalizing correlator 41 is compared with a threshold value in the comparator 42. Because the transmitted signal has a peak in each of the repetition signals P1 to P10, as shown in FIG. 2, by comparing the correlation value outputted from the normalizing correlator 41 with the threshold value in the comparator 42 it is possible to output a high-level signal for each of the repetition signals.

The output of the comparator 42 is inputted to the synchronization signal generating circuit 43. This synchronization signal generating circuit 43 is made up of M ($\leq N-1$) delay elements 431 connected in series and an AND circuit 432 for taking the logical product of the outputs of the delay elements 431. The delay times of the delay elements 431 are equal to the period of the repetition signals and are set in units of the sample period of the A/D converter 30, for example, to sixteen sample periods.

With this construction, when the output of the comparator 42 is high-level and also the outputs of the M delay elements 431 are all high-level, that is, when the output of the comparator 42 and the outputs of the delay elements 431 are all true, a high-level signal is outputted from the AND circuit 432 as a synchronization signal at symbol timing.

Specifically, when M+1 consecutive high-level signals have been outputted from the comparator 42, the synchronization signal generating circuit 43 recognizes repetitiveness of the output results of the comparator 42 and outputs a synchronization signal at that timing.

Figure 7:
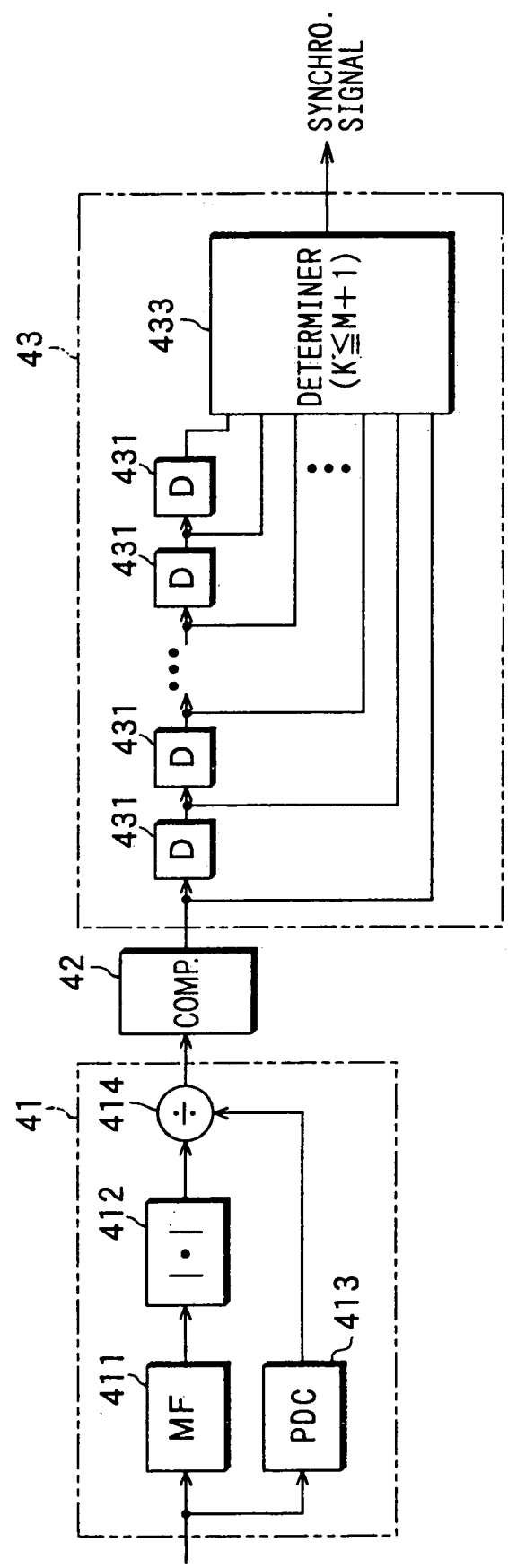
FIG. 7 is a block diagram showing another type of the symbol timing detection circuit shown in FIG. 3.

Another type of the construction of the symbol timing detection circuit 40 is shown in FIG. 7. This symbol timing detection circuit 40 differs from the construction shown in FIG. 4 in that a determiner 433 is provided instead of the AND circuit 432. This determiner 433 determines whether or not the number of outputs at the high level among the output of the comparator 42 and the outputs of the M delay elements 431 is equal to or greater than K ($K \leq M+1$), and outputs a synchronization signal when this determination is affirmative (YES).

With this construction, even when with respect to the N repetition signals in the preamble high-level signals outputted from the comparator 42 are not consecutive (that is, there are missing signals), if K high-level signals are outputted from the comparator 42, a synchronization signal is outputted at that timing.

In the constructions shown in FIG. 4 and FIG. 7, the number of delay elements 431 can be made less than N to reduce the number of signal lines leading directly to the AND circuit 432 or determiner 433 from the comparator 42.

Figure 8:
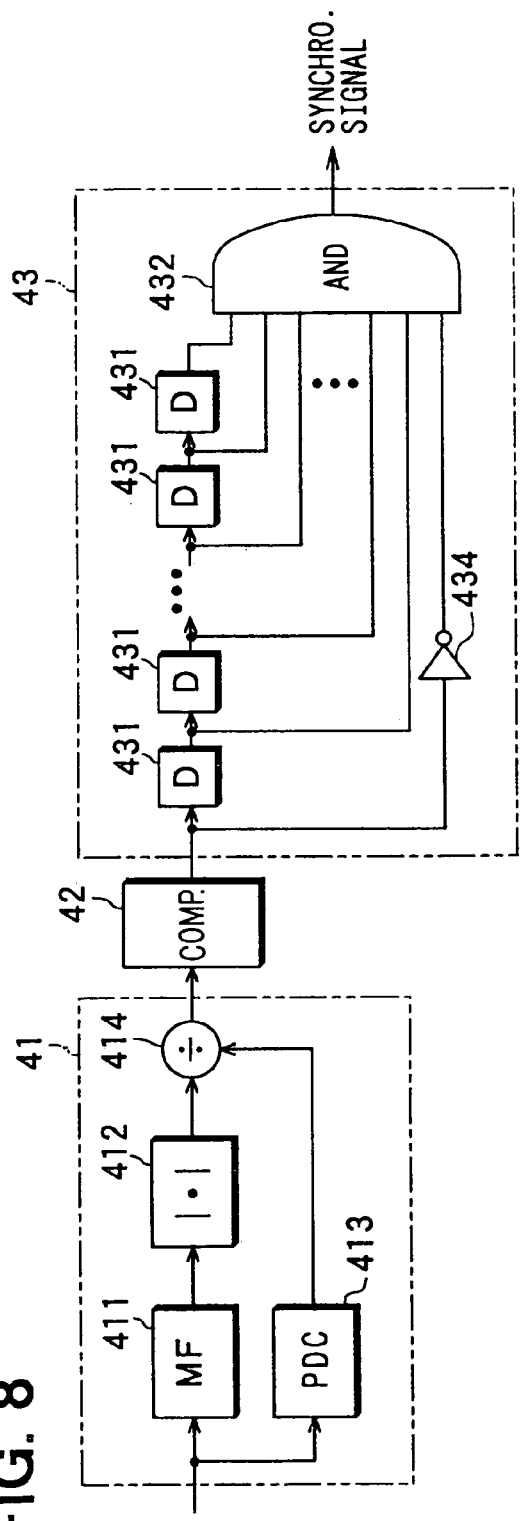
FIG. 8 is a block diagram showing a further type of the symbol timing detection circuit shown in FIG. 3.

A further type of the construction of the symbol timing detection circuit 40 is shown in FIG. 8. This symbol timing detection circuit 40 differs from the construction shown in FIG. 4 in that a signal obtained by inverting the signal outputted from the comparator 42 with an inverter 434 is inputted to the AND circuit 432.

With this construction, when the outputs of L ($L \leq N$) delay elements 431 are all high-level and also the output of the comparator 42 is low-level, indicating that repetition has ended (that is, when the output of the delay elements 431 and the signal obtained by inverting the output of the comparator 42 are all true), a synchronization signal is outputted from the AND circuit 432.

Specifically, when L consecutive high-level signals have been outputted from the comparator 42 and thereafter a low-level signal has been outputted, this synchronization signal generating circuit 43 shown in FIG. 8 recognizes repetitiveness of the output results of the comparator 42 and the ending of periodicity and outputs a synchronization signal at that timing.

By this means it is possible to carry out preamble detection and output a precise timing signal still more certainly than with the symbol timing detection circuit shown in FIG. 4.

Figure 9:
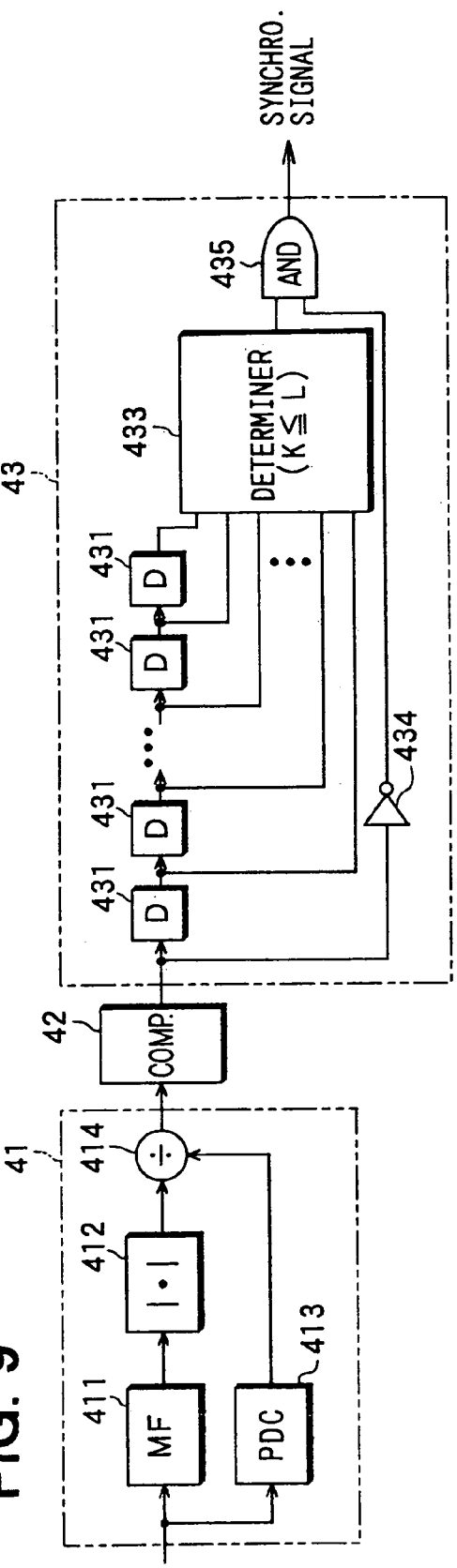
FIG. 9 is a block diagram showing a still further type of the symbol timing detection circuit shown in FIG. 3.

A still further type of the construction of the symbol timing detection circuit 40 is shown in FIG. 9. This symbol timing detection circuit 40 differs from the construction shown in FIG. 8 in that, instead of the AND circuit 432, there are provided a determiner 433 and an AND circuit 435 for taking the logical product of the output of the determiner 433 and the output of an inverter 434. The determiner 433 determines whether or not the number of outputs at the high level among the outputs of the L delay elements 431 is equal to or greater than K ($K \leq L$), and outputs a high-level signal when this determination is affirmative (YES).

With this construction, when K high-level signals have been outputted from the comparator 42 and also a low-level signal, indicating that repetition has ended, has been outputted from the comparator 42, a synchronization signal is outputted from the AND circuit 435.

In the construction shown in FIG. 9, the delay elements 431 and the determiner 433 are for recognizing repetitiveness of the comparison results and outputting a first recognition signal (the output signal of the determiner 433); the inverter 434 is for recognizing the ending of periodicity and outputting a second recognition signal (the output signal of the inverter 434); and the AND circuit 435 is for outputting a synchronization signal when the first and the second recognition signals are outputted. In FIG. 9, instead of using the determiner 433, an AND circuit 432 of the kind shown in FIG. 8 can be used.

FIG. 10 shows the output of the comparator 42 and the synchronization timing detection results obtained when five-repetition detection, four-repetition detection, three-repetition detection and two-repetition detection were carried out with the number L of delay elements 431 respectively made five, four, three and two, and the number N of repetition signals in the preamble being 10, using a symbol timing detection circuit 40 of the construction shown in FIG. 8. The comparator 42 compares the correlation value output from the standardizing correlator with a threshold value, and in its output, as shown in the figure, not all of the peaks of the repetition signals are necessarily detected exactly. However, even in this kind of situation, in the cases of five-repetition detection and four-repetition detection, a synchronization signal is outputted at desired timing td. In the cases of three-repetition detection and two-repetition detection, synchronization signals are outputted before the desired timing td. Accordingly, an accurate synchronization signal can be obtained as long as the number of repetition detections is at least four.

Figures 11A, 11B:
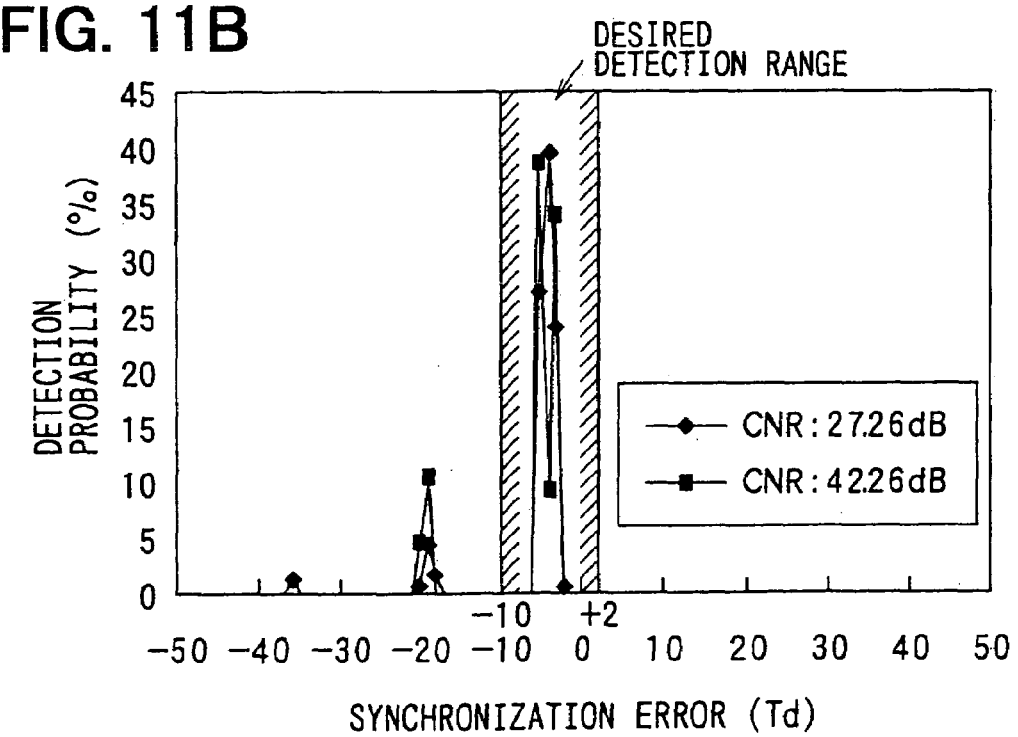
FIG. 11A is a table showing the specification of a communication system in which the symbol timing detection circuit shown in FIG. 8 was tested.
FIG. 11B is a graph showing probability of detection vs. synchronization error when the symbol timing detection circuit shown in FIG. 8 is tested.

FIG. 11B shows test result of probability of detection vs. synchronization error Td obtained when a symbol timing detection circuit 40 shown in FIG. 8 was used in the communication system the specification of which is shown in the table of FIG. 11A. As understood from FIG. 11A, the sub-carrier modulation is QPSK, the number of sub-carriers of the OFDM signal is 52, the system data rate is 24 Mbps, the sampling frequency is 20 MHz, the communication synchronization is incomplete, the data count per packet is 96 bytes, the speed of movement of the receiver device is 10.8 Km/h, the propagation path model was off-line-of-sight (propagation by indirect waves with no direct waves), the detection repetition number is five, and the forward shift is made five samples (the output timing of the synchronization signal is five sample periods before the end point of the preamble). In this case, the simulation was carried out for each of the two cases of the CNR (Carrier to Noise power Ratio) being 27.26 dB and 42.26 dB.

In the case of the communication system of this preferred embodiment, the desired synchronization detection range is defined to the sample periods in which the synchronization error (Td) is between −10 and 2. It can be seen from FIG. 11 that, even when the propagation model is made off-line-of-sight, synchronization detection can be achieved with a considerably high accuracy.

It is known that, in a communication system using OFDM, reception characteristics improve when the output timing of the synchronization signal is made earlier than the end point of the preamble. Therefore, by causing the synchronization signal to be outputted before the end point of the preamble, as in this preferred embodiment, it is possible to obtain a receiver device having good reception characteristics.

The present invention is not limited to application to a communication system using OFDM and can be applied to a communication system using some other method as long as it conducts packet communication in bursts and uses repetition signals in a preamble of each packet signal.

What is claimed is:

1. A signal synchronization method for a communication system which conducts packet communication in bursts, the method comprising:
   receiving a packet signal transmitted in bursts the packet signal being made up of data and a preamble including a signal repeated a known number of times;
   comparing a correlation value of each of the received repeated signals and at least one additional signal with a threshold value; outputting a signal based on each of the results of the comparing of the correlation values; comparing the outputted signals; and
   generating a synchronization signal on the basis of the comparison of the outputted signals when an ending of a periodicity of same results of said comparison of the outputted signals are recognized after repetitiveness of said periodicity, the repetitiveness of said periodicity being that the same results of said comparison of the outputted signals occur more than a predetermined number of times which is less than the known number of times, and the ending of said periodicity being that a result of said comparison of the outputted signals differs from the same results.

2. The signal synchronization method according to claim 1, wherein the results of the comparison of the outputted signals are successively delayed by a plurality of delay elements connected in series, and the repetitiveness and ending of periodicity of the results of the comparison of the outputted signals are recognized on the basis of output results of the delay elements and a signal obtained by inverting the results of the comparison of the outputted signals.

3. The signal synchronization method according to claim 2, wherein the repetitiveness and ending of periodicity of the results of the comparison of the outputted signals are recognized when the outputs of the delay elements and the signal obtained by inverting the results of the comparison of the outputted signals are all true.

4. The signal synchronization method according to claim 2, wherein the repetitiveness and ending of periodicity of the comparison of the outputted signals are recognized when the number of outputs of the delay elements which are true is at least a predetermined number, and the signal obtained by inverting the results of the comparison of the outputted signals is true.

* * * * *